Dec. 28, 1937.  L. C. THOMAS  2,103,651
ACCOUNTING SYSTEM
Filed Dec. 1, 1936  2 Sheets-Sheet 1
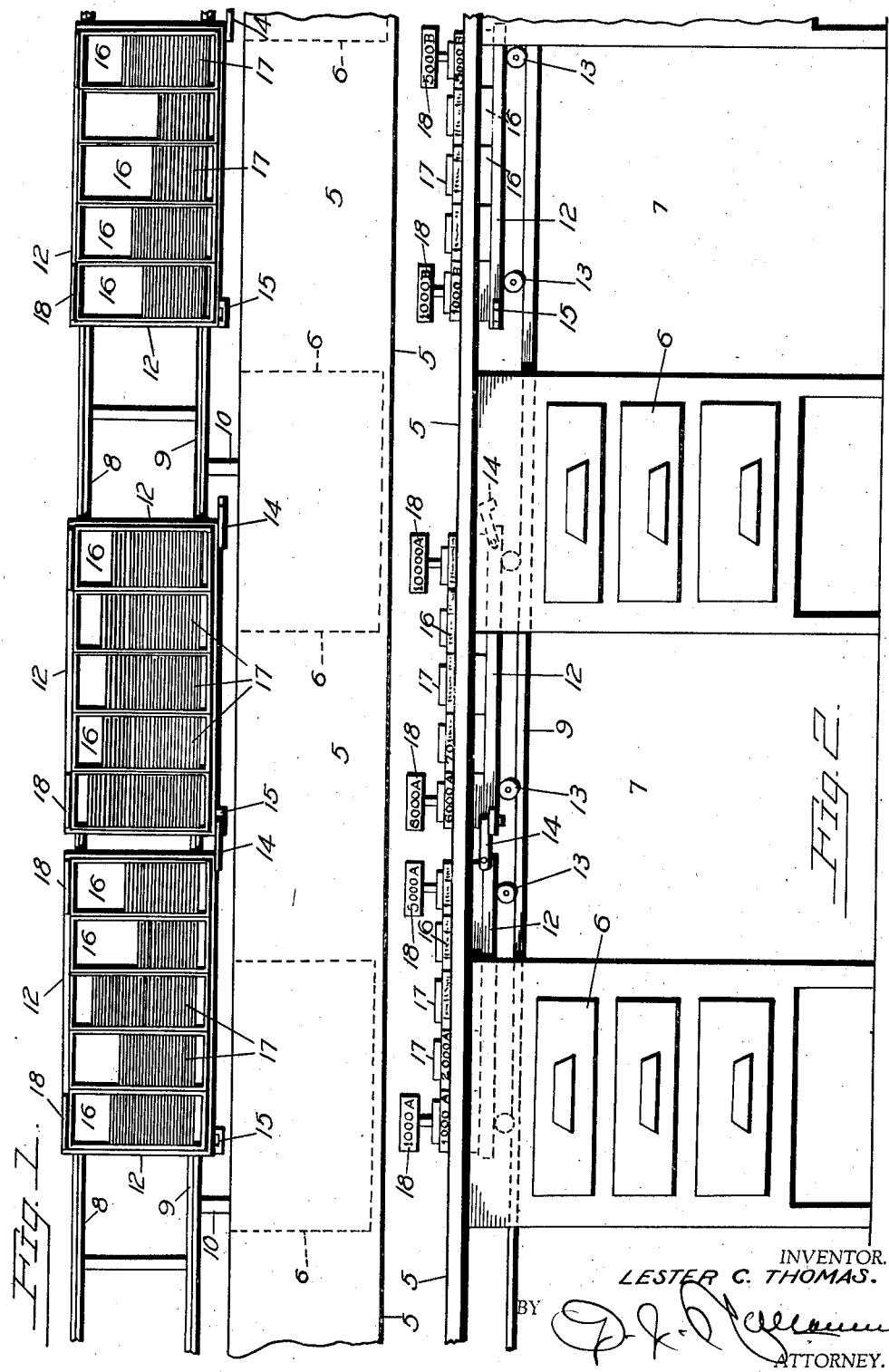
INVENTOR.
LESTER C. THOMAS.
BY
ATTORNEY.

Dec. 28, 1937.    L. C. THOMAS    2,103,651
ACCOUNTING SYSTEM
Filed Dec. 1, 1936    2 Sheets-Sheet 2

INVENTOR.
LESTER C. THOMAS
BY
ATTORNEY.

Patented Dec. 28, 1937

2,103,651

UNITED STATES PATENT OFFICE 2,103,651

ACCOUNTING SYSTEM

Lester C. Thomas, Denver, Colo.

Application December 1, 1936, Serial No. 113,642

2 Claims. (Cl. 45—2)

This invention relates to improvements in accounting systems, more particularly for the purpose of keeping a perpetual inventory.

In many lines of business, it is desirable to keep a perpetual inventory of stocks of merchandise and the like that are constantly changing. For instance, in a wholesale automobile parts business, many hundreds of different kinds of parts may be normally kept in stock. During a business-day sales and shipments may draw on this stock and fresh stocks may be ordered and received. Such a varied stock of merchandise changes rapidly and unless a perpetual inventory is kept, certain items may be exhausted from stock with a consequent loss of business, and other items may be overstocked or duplicate reorders may occur.

The advantages of a perpetual inventory are well known in lines of business where many different kinds of articles of merchandise or parts for manufacturing purposes and the like are handled.

It is an object of the present invention to provide a system that will enable a clerk to keep a perpetual inventory covering a large number of items with a minimum expenditure of time and labor.

Another object is to provide a system of this character that can be used efficiently by one clerk or by a plurality of clerks when necessary, without any definite limit as to the number of workers using it simultaneously.

A further object is to provide means for keeping a perpetual inventory that may be used or enlarged to accommodate a large or growing stock of parts practically without limit as to capacity.

A still further object is to furnish facilities for keeping a perpetual inventory or the like, having separate cards or sheets corresponding to different items or groups of items in the stock, and which may be identified and reached by a clerk quickly, with little effort, for making an entry thereon, whereby each clerk may keep a relatively large number of such cards or sheets constantly posted.

Other objects and advantages will be more fully disclosed in the following description and in the drawings wherein like parts have been similarly designated and wherein;

Figure 1 is a plan view of a system constructed according to the invention; and

Figure 2 is a front elevation of the same.

Figure 3:
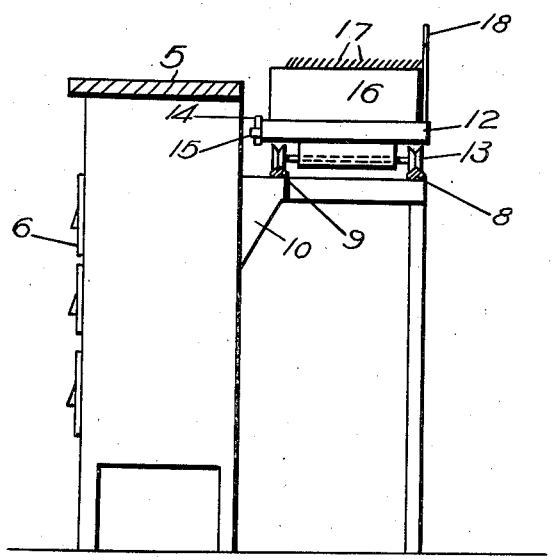
Figure 3 is a typical transverse section of the system shown in Figures 1 and 2.

Reference character 5 denotes a narrow desk or table having sets of drawers 6 at spaced intervals and providing knee room for a clerk to sit at the desk at spaces 7 if and when desired.

Along one side of the desk is mounted a track composed of rails 8 and 9, supported by any convenient means, such as brackets 10 connecting the track to the desk in parallel and spaced relation. A plurality of carriage units 12 are provided with flanged wheels 13 that roll on the track-rails and each carriage unit is provided with a hook 14 and an eye 15 whereby they may be optionally connected or separated.

Each carriage is provided with card-holding files 16, in which are cards 17 provided with any suitable ruling or printing and preferably indexed by some predetermined system such as numbers or letters corresponding to the name and/or stock number of the item or items to be listed upon each card.

Markers 18 may be mounted on each carriage to identify by large characters thereon, the range of index characters carried on each carriage, so that a clerk may see at a distance which carriage carries any wanted card. Since there is no definite limit to the length of the desk and track which may be straight or arranged in an endless formation such as an oval or a circle, it is illustrated as having both ends broken to indicate its broad possibilities. Sufficient units of the apparatus are shown to make the system very clear.

Operation

In use, a clerk may sit at any convenient space 7, and if only one clerk is on duty, all of the carriages may be connected so that they all roll on the track as one unit and every card in the files may be readily brought in front of the user, as wanted for posting. Items to be posted, such as sales and shipping tickets, receiving slips and the like, are delivered to the clerk on duty, whereupon he pulls the carriages, to bring the card upon which a record is to be made, directly in front of him. The proper card is then located and individually removed from the file, and the entry is made. The card is then replaced in the file and the next card to be posted is brought to the hand of the clerk by moving the carriages. Thus, only one clerk may post the entire card record without leaving his chair. As the items are posted on the cards the slips may be checked and placed in one of the desk drawers for later disposition, the more important inventory card-record having been made.

While this system enables one clerk to post a large number of stock changes hourly, a particular rush of business may make it desirable for more than one clerk to work on a perpetual inventory. In case more than one clerk is working, the carriages may be divided into groups or separated into the individual units, and each clerk may occupy a different space at the desk and post the cards that are located in a certain group of files which may be moved on their carriages along the track to suit any division of the work among a plurality of clerks.

If the nature of the business is such that it is unnecessary to have an inventory clerk on duty at all times, the slips and tickets representing stock changes may be collected at the end of the business-day or at any other convenient time, and one person can post them all from one chair in a very efficient manner, making many entries in a relatively short time. If the stock to be accounted for grows so that more cards are required to keep the inventory record, then additional carriages with card-files may be added and when the track is filled it may be indefinitely extended to accommodate a large number of carriages without any particular limit.

The desk or table 5 is preferably narrow so that the clerk may easily reach across it to the cards. The whole card-file, containing the cards immediately to be posted, may be lifted off the carriage and placed on the desk; especially would this be desirable when a number of entries are to be made on cards in one file at one time. Or one or more cards may be selected and removed from the file while keeping the file on the carriage.

While the system described is well adapted for the purpose of keeping a perpetual inventory, it may also readily be used for any kind of an accounting or recording system where numerous entries are to be quickly and efficiently made such as, for instance, keeping a constant balance in individual checking accounts in a bank where deposits and withdrawals are constantly occurring during business hours. The individual cards or sheets 17 may be of any convenient size or nature to suit the requirements of the business. They may be adapted to fit into a bookkeeping machine or the like or be intended for hand-posting.

The zone adjacent a space 7 may be considered as an operator's station, and the markers on the carriages are preferably of a nature that may be recognized by an operator without leaving the station, at any distance to which the carriages would normally be moved along the track. To this end the markers may bear any distinguishing characteristic such as, for instance, color, size, shape or characters of any predetermined system.

What I claim and desire to secure by Letters Patent is:

1. An accounting system of the character described comprising a track, carriages separately movable on the track, means for connecting the carriages end to end in a train for conjoint movement along the track, record-bearing cards systematically arranged on the carriages, and a desk-like surface above the track upon which the cards may be placed for record-entries, the cards on the carriages normally projecting above the surface.

2. An accounting system comprising a track, carriages separately movable on the track, means for connecting the carriages end to end in a train for conjoint movement along the track, card-holding files removably fitted on the carriages, record-bearing cards systematically positioned in the files, and a desk-like surface connected with the track and positioned therealong to support individual cards for making entries thereon.

LESTER C. THOMAS.